United States Patent [19]
Hesse

[11] Patent Number: 5,515,360
[45] Date of Patent: May 7, 1996

[54] METHOD FOR MONITORING THE THROUGH-CONNECT PATHS FOR INFORMATION TRANSMITTED IN THE FORM OF DATA BYTES IN DIGITAL TIME-DIVISION MULTIPLEX SWITCHING EQUIPMENT

[75] Inventor: Dieter Hesse, Munich, Germany

[73] Assignee: Siemens Aktiengesellschaft, Munich, Germany

[21] Appl. No.: 378,673

[22] Filed: Jan. 26, 1995

[30] Foreign Application Priority Data

Jan. 26, 1994 [EP] European Pat. Off. .............. 94101134

[51] Int. Cl.⁶ ...................................................... H04J 3/14
[52] U.S. Cl. .................. 370/14; 370/16; 370/54; 370/58.1; 370/60; 371/48; 371/49.1; 371/49.3; 340/827; 395/182.04; 395/182.05
[58] Field of Search ........................ 370/13, 16, 14, 370/65.5, 60, 110.1, 53, 54, 58.1, 58.2; 340/827; 371/48, 49.1, 49.2, 49.3; 395/182.04, 182.05

[56] References Cited

U.S. PATENT DOCUMENTS

| | | |
|---|---|---|
| 4,328,580 | 5/1982 | Stockham, Jr. et al. ............... 371/10.2 |
| 4,345,324 | 8/1992 | Smitt ...................................... 370/14 |
| 5,199,028 | 3/1993 | Arnold .................................... 370/60 |
| 5,200,746 | 4/1993 | Yoshifuji ............................... 370/65.5 |
| 5,229,990 | 7/1993 | Teraslinna ............................. 370/16 |
| 5,268,909 | 12/1993 | Loebig .................................. 370/14 |
| 5,406,563 | 4/1995 | Loebig .................................. 370/14 |
| 5,442,647 | 8/1995 | Loebig .................................. 370/14 |

*Primary Examiner*—Hassan Kizou
*Assistant Examiner*—Scema S. Rao
*Attorney, Agent, or Firm*—Hill, Steadman & Simpson

[57] ABSTRACT

In a method for monitoring the through-connect paths in digital switching equipment, the data bytes to be through-connected are divided into at least two halves and are through-connected via parts of the through-connect means of the switching equipment that are independent of one another. At least one of the parts of the data byte is accompanied by a parity bit that relates either to the parity of the entire data byte or to the parity of respectively one of the other parts of the data byte. A reunification of the parts of the data byte and a corresponding parity check occur after the through-connection. Selection or drive errors can also be recognized, and the error location can be localized in this way with a parity check.

6 Claims, 1 Drawing Sheet

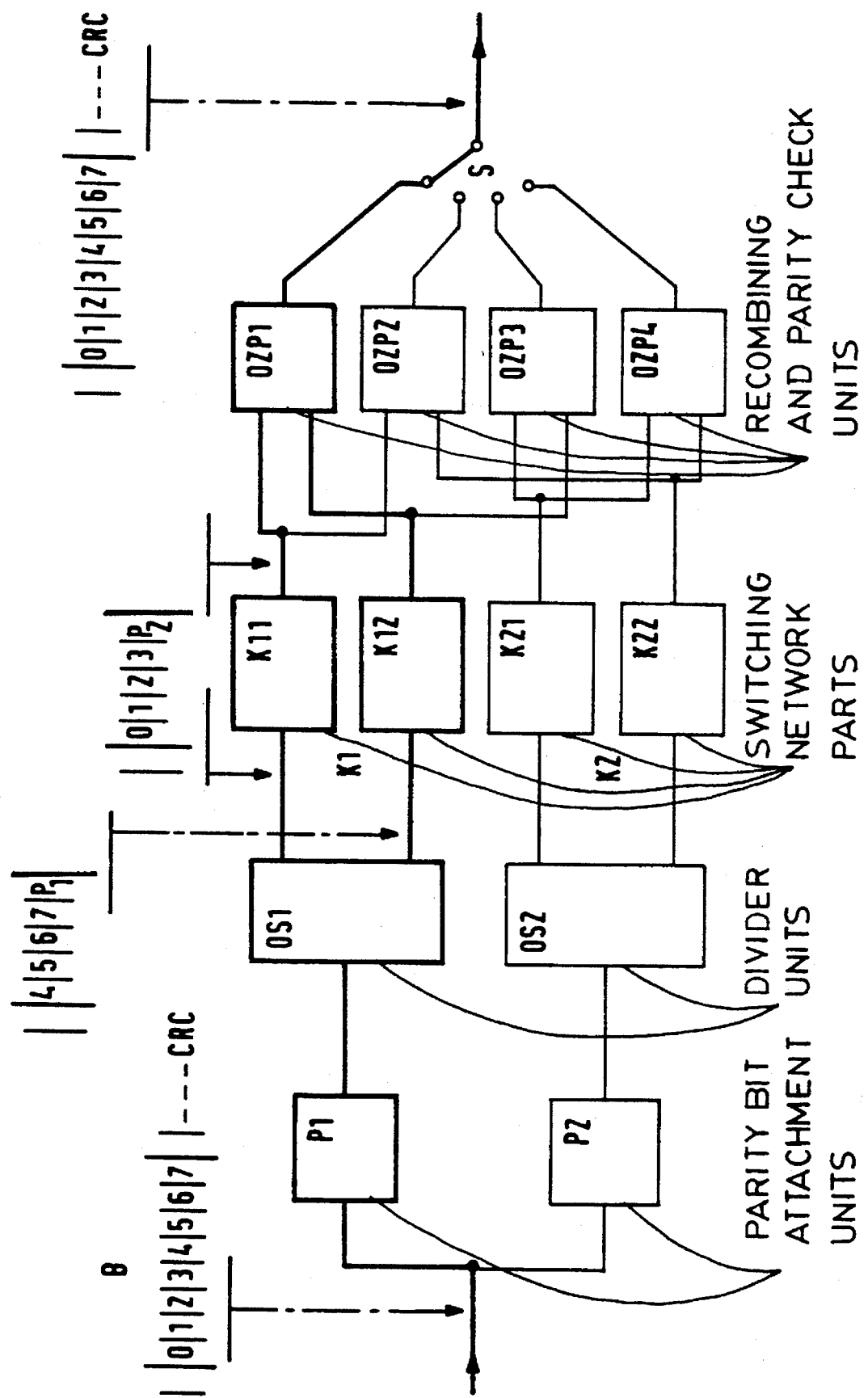

METHOD FOR MONITORING THE THROUGH-CONNECT PATHS FOR INFORMATION TRANSMITTED IN THE FORM OF DATA BYTES IN DIGITAL TIME-DIVISION MULTIPLEX SWITCHING EQUIPMENT

BACKGROUND OF THE INVENTION

FIELD OF THE INVENTION

The invention is directed to a method for monitoring the through-connect paths for information transmitted in the form of data bytes in digital time-division multiplex switching equipment.

Monitoring of the voice paths in time-division multiplex switching equipment is required in order to be able to recognize and localize faulty working of, in particular, that part of the switching equipment serving the purpose of a through-connection in order to either undertake an alternate switching of the affected parts until they are replaced, or to even see to an orderly abort of existing connections under certain circumstances.

Since, due to the time-division multiplex mode, the individual data bytes of the data stream incoming at a switching equipment unit change their time slot dependent on their allocation to a specific communication path, data protection techniques that extend over the totality of the data stream are not suitable; on the contrary, an error recognition that is individually associated to a voice path must be enabled.

A parity check of the data bytes conducted over the individual voice paths would not be adequate for an error recognition since, for example, misadjustment of the throughconnect paths cannot be recognized because the through-connected data bytes in such instances are in fact not the ones anticipated, but are inherently undisturbed.

In instances where the through-connect means of the switching equipment is redundant, whereby one half of the through-connect means is active in the normal case and the other half is available in a standby mode since the through-connect paths therein are likewise in fact set but the data stream likewise conducted over them is not forwarded, an additional test criterion can be acquired by comparing the two data streams. Given a lack of coincidence in case of error, further testing techniques must then be used to identify in which half of the two halves of the through-connect means the disturbance lies. When the malfunctioning half is subsequently temporarily taken out of operation until the error is eliminated, this additional test criterion no longer exists.

There would in fact be the possibility to provide the through-connect means more than just redundantly, in which case a parity check as the one testing technique could even be completely forgone and there is still the possibility of recognizing an error and the possibility of an alternate circuit even after a part of the through-connect means is taken out of operation after identifying an error in this part. Such a solution, however, involves a correspondingly high expense.

SUMMARY OF THE INVENTION

An object of the invention is to specify a method for monitoring with reasonable expense and a high probability the through-connect paths in digital switching equipment and which also allows errors that lie in the drive of the elements of the through-connect means in the route setting.

According to the present invention, a method is provided for monitoring through-connect paths for information transmitted in the form of data bytes in a digital switching equipment network. The data bytes are divided into at least two parts before their through-connection, the parts of the data bytes being through-connected across parts of through-connect means of the digital switching equipment network that are independent of one another. At least one of the parts of the data byte is accompanied by a parity bit that relates either to a parity of an entire byte or to a parity of one of other parts of the data byte. A reunification of the parts of the data byte including a potential plurality of parity bits and a corresponding parity check is provided after through-connection.

Upon implementation of the method, the check can remain limited to a parity check that leads to the recognition of errors and also to the recognition of errors in the route setting in through-connect means wherein a redundancy for the purpose of the alternate circuit is not provided.

According to a further development of the invention, it is indicated how one is to proceed given through-connect units that comprise a redundancy formed of an active half and a half operating in a standby mode.

In further developments of the invention, either more beneficial possibilities of error recognition after an alternate circuit as well are provided, or the required switching techniques between the parts of the redundant through-connect unit are less complicated.

The invention shall be set forth in greater detail below on the basis of an exemplary embodiment with reference to the Drawing FIGURE.

BRIEF DESCRIPTION OF THE DRAWING

The Drawing FIGURE illustrates in block diagram format the method of the invention for monitoring through-connect paths for information transmitted in the form of data bytes and a digital equipment network.

DESCRIPTION OF THE PREFERRED EMBODIMENTS

As the critical parts of a time-division multiplex switching equipment of interest here, the Drawing FIGURE shows a redundant through-connect unit in the form of a switching network having the two switching network halves K1, K2. Each of these switching network halves is in turn divided into two parts K11 and K12 or F21 and K22. Let the one half K1 of the switching network be in the active condition, this being indicated by heavier lines, in contrast whereto the other switching network half K2 is in a standby mode in that the parallel connections corresponding to the switching network half K1 are set up therein but are not activated.

The data information supplied to the switching network appear in the form of bytes B covering, for example, 8 bits, and are a component part of a data stream that is protected with an appropriate code, for example a cyclic code CRC (cyclic redundancy code) in view of monitoring for errors that can occur on the existing transmission link. As indicated at the outset, however, such a code is not suitable for monitoring the through-connect paths through the switching equipment and, in particular, through the switching network.

Before such data bytes B reach the switching network K1/K2, they pass through parity bit attachment unit P1 or parity bit attachment unit P2 where at least one parity bit is attached and with which the bits of such a byte or of a part thereof are supplemented depending upon whether an even-numbered or an odd-numbered parity is declared.

For each switching network half, the data bytes B must also pass through a divider unit OS1 or a divider unit OS2, each of which respectively comprises two outputs that are connected to an input of the first part K11 or K21 and of the second part K12 or K22 of the corresponding half of the switching network.

The supplied data bytes are each divided into two parts by these units OS1 and OS2, these two parts being then supplied to the corresponding two parts of the switching network halves.

Recombining and parity check units OZP1 through OZP4 are arranged at the output side of the switching network parts K1, K2, the respective two inputs of the units OZP1 through OZP4 being connected in all possible combinations to the outputs of respectively two of the parts K11 through K22 of the switching network parts K1 and K2. Their job is comprised in recombining the parts of data bytes supplied to them from the corresponding switching network parts and in implementing a parity check.

A switch S optimally connects the output of one of these units OZP to the outgoing transmission line Im—emphasized here by heavier lines—and only the data bytes that were through-connected via the switching network parts K11 and K12 of the switching network half K1 are forwarded at the output side in the normal case illustrated by the switch position of the switch S.

Let it be assumed in the present case that a data byte B is provided with two parity bits by the units P1, P2, these respectively supplementing 4 bits of such bytes to an even-numbered parity. The units OS1 and OS2 then split the bytes into two halves, each thereof comprising 4 bits as well as the parity bit that belongs to the respective other half, and then conduct these halves to the parts K11 through K22 of the switching network halves.

When it is now assumed that a bit falsification occurs in a through-connect through the part K11 of the switching network half K1 but the through-connection through the second part K12 of this switching network half is error-free, i.e. that a simple error is present with respect to the entire byte reunited by the units OZP1, then the parity check undertaken by the units OZP1 will be able to identify the existence of an error, whereby at which of the parts K11 and K12 the through-connect error has arisen cannot yet be recognized. As a further condition for the presence of a simple error, it is assumed that the corresponding through-connect of data byte parts through the second switching network half K2 occurs error-free. When the units OZP3 (to which the second data byte part through-connected across the switching network part K12 is likewise supplied as one of the input quantities) signals freedom from error, a bit falsification in the through-connect through the switching network part K11 can be excluded. The switching network part K11 has thus been defined as the error location.

It is now assumed that a drive or selection error occurs in the through-connect through the part K11 of the switching network half K1, i.e. that a bit half appears at the output side whose bits have remained falsified but that do not correspond to the anticipated bit combination. As set forth initially, such an error would not be recognizable with a simple parity check.

When it is now assumed that the byte half through-connected through the part K11 as a consequence of the drive or selection error in fact has a different parity than the anticipated byte half, but is accompanied by a parity bit of the same binary value as the anticipated byte half or, on the other hand, in fact has the same parity as the anticipated data byte half but is accompanied by a parity bit that has a different binary value than the parity bit accompanying the anticipated data byte half, i.e. only a simple error is present in this respect, then such a drive or selection error can be recognized. Here, as in the above-described case, it is also possible to localize the error location over and above the determination of the presence of an error by evaluating the signals output by all of the units OZP1 through OZP4.

The probability of recognizing drive or selection errors can be enhanced in that the switching network halves are divided not only into two but into three or more parts and, correspondingly, the data bytes are split into three or more parts; this, of course, is a question of expense.

When, after identifying an error in the active switching network half, a switch is undertaken to the switching network half that previously operated in a standby mode and the previously active switching network half is deactivated, there is still the possibility of finding an error, even though an error localization is no longer possible without further ado.

When, as an alterative to this standby switching concept, however, one proceeds such that only the part of the active switching network half recognized as the error location is deactivated and is replaced by a corresponding part of the standby half of the switching network, i.e. when a total of three switching network parts are still available for the through-connection and for the error recognition, then all errors can continue to be recognized and localized. Although the invention has been described with respect to preferred embodiments, it is not to be so limited as changes and modifications can be made which are within the full intended scope of the invention as defined by the appended claims.

I claim as my invention:

1. A method for monitoring through-connect paths for information transmitted in the form of data bytes in a digital switching equipment network, comprising steps of:

assigning at least first and second parity bits to each data byte;

dividing each data byte into at least first and second parts before their through-connection, the parts of the data bytes being through-connected across parts of through-connect means of the digital switching equipment network that are independent of one another;

accompanying each of the parts of each of the data bytes by a parity bit that relates to a parity of the other part of the respective data byte; and providing a reunification of the first and second parts of each of the data bytes with their respective second and first parity bits and then conducting a parity check.

2. A method according to claim 1 including the steps of:

providing the digital switching equipment network as two redundant through-connection halves, each half being formed of at least two switching network parts operating independent of one another;

operating one of the two halves in a standby mode in a normal operating condition wherein the other half operates in an active mode, and wherein standby mode data information is through-connected in the same way as in the active half, but are not forwarded; and providing reunification of corresponding parts of each of the data bytes transmitted across the two halves and making corresponding parity checks.

3. A method according to claim 2 wherein given determination of a faulty through-connect path, the entire active half is deactivated and is replaced by the standby half that had been kept in a standby mode up to then.

4. A method according to claim 2, wherein given determination of a faulty through-connect path, only an effected part of the active path is deactivated and is replaced by a part of the standby half kept available in the standby mode up to then.

5. A method according to claim 2 wherein a first second of the two redundant through-connection halves has first and switching network parts and a second of the two redundant through-connection halves has third and fourth switching network parts, and wherein for said reunification and corresponding parity checks, first, second, third, and fourth recombining and parity check units are provided, and wherein the first recombining and parity check unit is connected to the first and second switching network parts, the second recombining and parity check unit is connected to the first and fourth switching network parts, the third recombining and parity check unit is connected to the second and third switching network parts, and the fourth recombining and parity check unit is connected to the third and fourth switching network parts so that the corresponding parity checks can occur in all possible combinations.

6. A method for monitoring through-connect paths for information transmitted in the form of data bytes in a digital switching equipment network, comprising the steps of:

assigning at least a first parity bit to each data byte;

dividing each data byte into at least first and second parts before their through-connection, the parts of the data bytes being through-connected across of through-connect means of the digital switching equipment network that are independent of one another;

accompanying one of the parts of each of the data bytes by the at least one parity bit; and providing a reunification of the first and second parts of each of the data bytes with the respective first parity bit and then conducting a parity check.

* * * * *